United States Patent [19]

Gordon

[11] Patent Number: 5,262,773
[45] Date of Patent: Nov. 16, 1993

[54] METHOD AND APPARATUS FOR MICROBURST AND WAKE TURBULENCE DETECTION FOR AIRPORTS

[76] Inventor: Andrew A. Gordon, 5193 Woodley Ave., Encino, Calif. 91436

[21] Appl. No.: 874,962

[22] Filed: Apr. 27, 1992

Related U.S. Application Data

[63] Continuation-in-part of Ser. No. 696,168, May 6, 1991, abandoned.

[51] Int. Cl.⁵ ............................................. G08B 23/00
[52] U.S. Cl. ................................ 340/968; 73/170.11; 340/949; 342/26
[58] Field of Search ............... 340/963, 968, 949, 961; 73/170 R, 189, 178 T, 147; 364/439, 434, 424.01, 424.06; 342/26, 32, 36, 37, 29, 460

[56] References Cited

U.S. PATENT DOCUMENTS

| | | | |
|---|---|---|---|
| Re. 33,152 | 1/1990 | Atlas | 342/26 |
| 3,735,333 | 5/1973 | Balser et al. | 342/26 |
| 4,712,108 | 12/1987 | Schwab | 342/26 |
| 4,812,844 | 3/1989 | Kallstrom | 340/968 |
| 4,891,976 | 1/1990 | Chato | 73/189 |
| 4,940,987 | 7/1990 | Krederick | 342/26 |
| 4,965,573 | 10/1990 | Gallagher et al. | 340/968 |
| 5,111,400 | 5/1992 | Yoder | 364/439 |
| 5,117,359 | 5/1992 | Eccles | 340/968 |
| 5,135,397 | 8/1992 | Yen | 342/26 |

OTHER PUBLICATIONS

"The Federal Triangle", Washington Post Oct. 17, 1983, CL-340-968 FAA Plans to Buy Wind-Shear Alert Devices.

Primary Examiner—Brent Swarthout
Attorney, Agent, or Firm—Jack C. Munro

[57] ABSTRACT

A method and apparatus for detecting specialized meteorological conditions such as a microburst and also the wind condition generated behind an aircraft known as wake turbulence. The method and apparatus of the present invention is designed to display the location of the microburst directly on the flight controller's monitoring screen with the flight controller then being able to so inform any pilot of an aircraft of the microburst so that the pilot can take evasive action. The display on the flight controller's screen is to be in color. The displaying of the microburst on the screen is to be by means of a computer which utilizes as inputs the conventional aircraft surveillance radar, weather radar and ground radar as well as additional inputs of wind direction and velocity information obtained from detection devices mounted directly adjacent to the aircraft runway and along the approach and take-off areas for the runway.

2 Claims, 2 Drawing Sheets

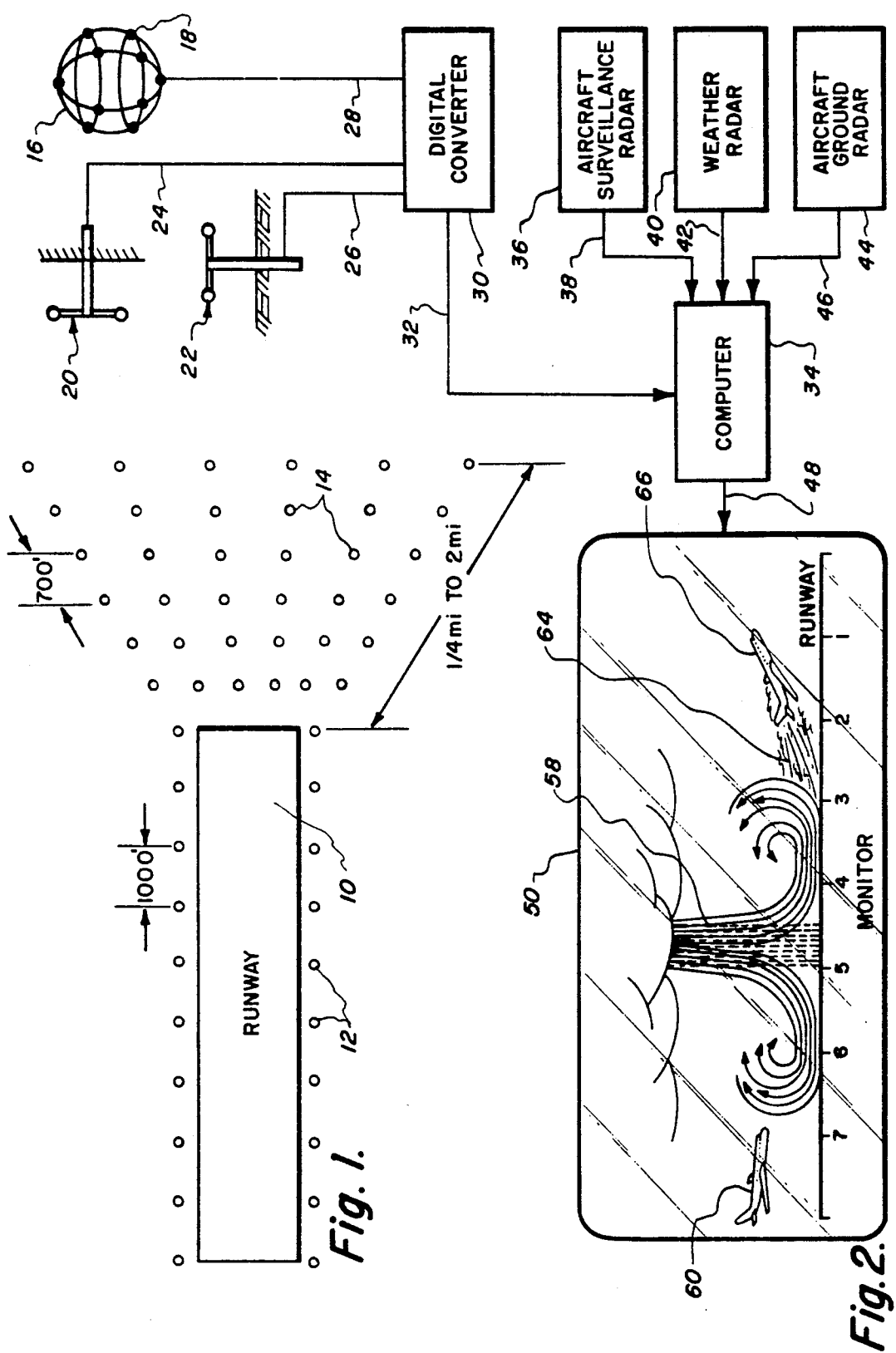

METHOD AND APPARATUS FOR MICROBURST AND WAKE TURBULENCE DETECTION FOR AIRPORTS

REFERENCE TO PRIOR APPLICATION

The subject matter of this application is a Continuation-In-Part of U.S. patent application Ser. No. 07/696,168, filed May 6, 1991, by the same inventor, entitled Gordon Windsheers and Wake Turbulence Detector and now abandoned.

BACKGROUND OF THE INVENTION

1) Field of the Invention

The present invention is directed to a system where a flight controller that controls aircraft landings and take-offs on a runway is able to observe the position and severity of wind conditions in close proximity to the aircraft runway.

2) Description of the Prior Art

Microbursts, which are also known as wind shear, have always been a serious hazard to aviation. The microburst is defined as a powerful downward blast of air usually associated with a thunderstorm or rain, followed by a violent horizontal burst of air in all directions (hence wind shear). Microbursts are relatively small such as two and a half miles in diameter or less, short lived, with ninety percent of the microburst reaching maximum velocity in ten minutes. A region of a superheated air some distance above the ground is initially penetrated by rain. The rain evaporates at a high rate to quickly reduce the air temperature and thereby increase the density of the superheated air. The now heavy air proceeds to move downwardly at an accelerating rate until it reaches ground level where it must now spread out horizontally. The short term nature of the microburst is explained since the rapid air fall causes a partial vacuum and thus as the air drops to the ground and is heated, it returns to reduce that partial vacuum. As additional rain penetrates the region, equilibrium results and the microburst terminates. Air has been found to gust down vertically as much as 4,000 feet per minute from distances of 2,000 feet from the ground. The basic shape of the microburst, if it could be seen, would be that of an inverted mushroom.

An aircraft flying through a microburst first encounters a head wind providing good lift. This head wind may be of up to fifty miles an hour. Then the aircraft, in a very short space of time and distance, encounters the opposite wind which now becomes a tail wind again at 50 miles an hour in the opposite direction. Thus the aircraft has now experienced a one hundred miles per hour air speed change over a distance as short as one mile. If an aircraft is flying flaps down and near landing speed and encounters a tail wind, the pilot experiences a sudden loss of air speed. If adjustments can not be made quickly enough, or if the plane is so heavily loaded or draggy that it can not make rapid accommodating changes, the aircraft may crash.

Explained a little differently, an aircraft during take-off and landing is typically purposely operated near stall speed and the acceleration capabilities of large aircraft are inadequate to cope with large air speed variations. The first symptom of the microburst is a relatively rapid increase in the head wind. This increases the airflow across the wings and if nothing else is changed would induce the aircraft to rise above the desired flight path. The typical pilot would choose to throttle back (as the pilot is trained to do) so as to reduce air speed to a target air speed. Almost immediately a down draft occurs and the head wind disappears and a strong tail wind becomes prevalent. Because the pilot is now in a powered down mode, increased air speed to counteract the tail wind is now required. However, the aircraft does not have the acceleration capabilities to cope with this rapid wind variation and aircraft stalling and subsequent crash is quite frequently a common occurrence.

It is to be remembered that the only time the microburst becomes a really serious hazard is when it appears in close relation to an airport runway to thereby cause aircraft to rapidly change in altitude in areas where any significant change in altitude is disastrous. The aircraft in relation to the runway is being operated at a very low altitude.

Once a microburst is detected, the pilot can be warned and could maneuver the aircraft either around the microburst or if knowing what is going to occur, the pilot could possibly maneuver the aircraft safely through the microburst. One way in which this could occur would be by the pilot not powering down when first encountering the head wind. Preferably, however, since microbursts are known to have exceedingly short life time (ten to fifteen minutes), a microburst which is detected directly adjacent to an aircraft runway will result in terminating of aircraft operations on that runway for that period of time.

Another undesirable wind condition is the wake created when an aircraft takes off. If a following aircraft encounters a wake, an exceedingly dangerous condition will occur. To avoid such a problem, flight controllers provide ample time between aircraft take-offs. However, if a flight controller could actually observe when this wake has dissipated, many more aircraft could take off in a given length of time eliminating the excess time that is now allowed, thereby alleviating of the traffic that is so common within many airports.

SUMMARY OF THE INVENTION

The structure of the present invention is directed to a method and apparatus which displays a discovered microburst and an aircraft wake on a flight controller's monitoring screen in relation to an airport runway and in relation to any aircraft that may be using that runway for take-off or landing. The flight controller quickly and easily observes the condition in the normal course of work of the controller with the controller not being required to take notice of a completely separate instrument. Alongside the runway in a particular spaced arrangement are a plurality of wind velocity and wind direction indicating devices. Also within the approach and landing areas in alignment with the runway, out some spaced distance such as up to two miles from the runway, there is located again a pattern of wind direction indicators and wind velocity indicators. These typical wind direction indicators would be in the form of a globular open frame through which wind can readily pass. Mounted on this frame are a plurality of wind direction sensors. Information on the wind velocity and the wind direction from each indicator is supplied to a computer. This computer also receives radar information having to do with weather, ground radar and air surveillance radar. This computer is preprogrammed to digest and analyze the information and upon a particular wind velocity and wind direction meteorological condition being observed, which is defined as a microburst, an appropriate microburst configuration, in a colorful pictoral representation, would be displayed directly on the flight controller's monitoring screen showing the position of the microburst in relation to any aircraft that may be in the area. The wake of any aircraft taking off is similarly pivotally displayed until the wake is dissipated.

The primary objective of the present invention is to provide a way for pilots of aircraft to ascertain a microburst in conflict with the flight path of the aircraft when the aircraft is in close proximity to an aircraft runway of an airport and hence then permit the pilot to take evasive action to avoid potential danger.

Another objective of the present invention is to arrive at a means of identifying the microburst and its location to the flight controller in conjunction with the flight controller's normal activities thereby not requiring any special additional duties on the part of the flight controller.

Another objective is to construct a microburst detection apparatus and method for doing so that can be incorporated in conjunction with the currently installed equipment in conjunction with airports thereby not requiring any significant expense in conjunction with additional equipment.

BRIEF DESCRIPTION OF THE DRAWINGS

FIG. 1 is a planned schematic view of an airport runway depicting an illustrative arrangement of mounting of the wind speed and wind velocity indicators in conjunction with the runway;

FIG. 2 is an overall schematic view of the entire apparatus of the present invention showing its relation to a flight controller's monitoring screen;

DETAILED DESCRIPTION OF THE SHOWN EMBODIMENT

Figure 3:
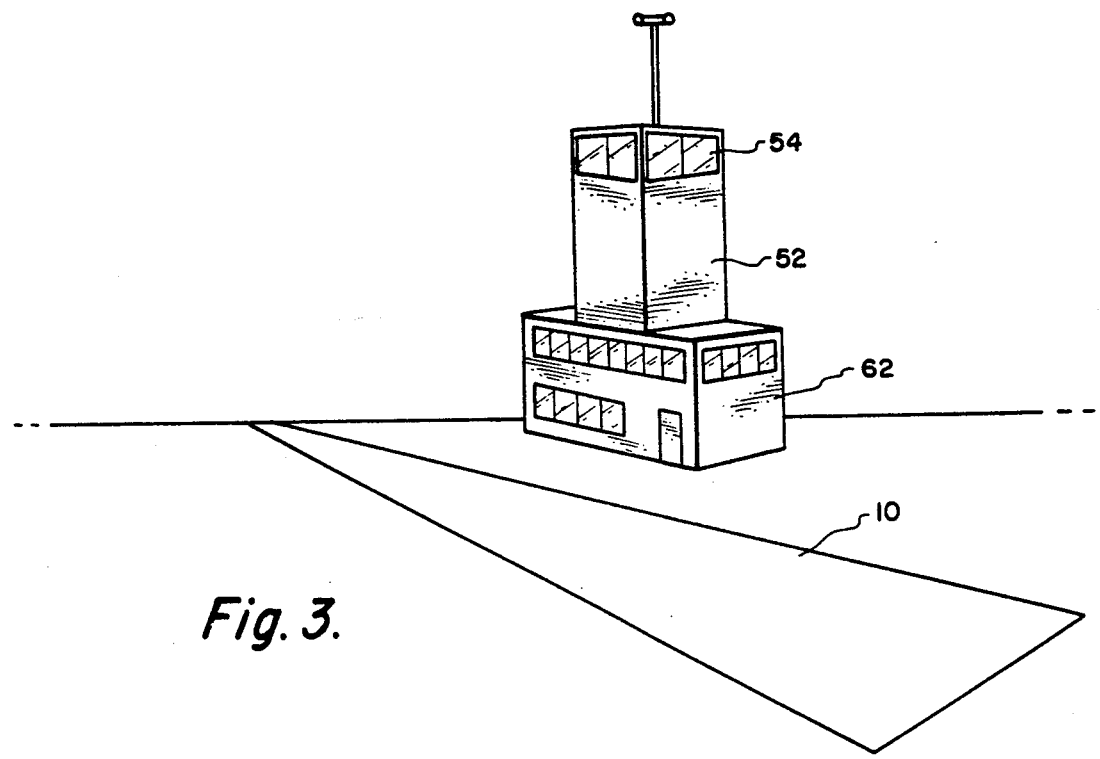
FIG. 3 shows a general view of a flight controller tower which is located directly adjacent to a typical aircraft runway for an airport.
Figure 4:
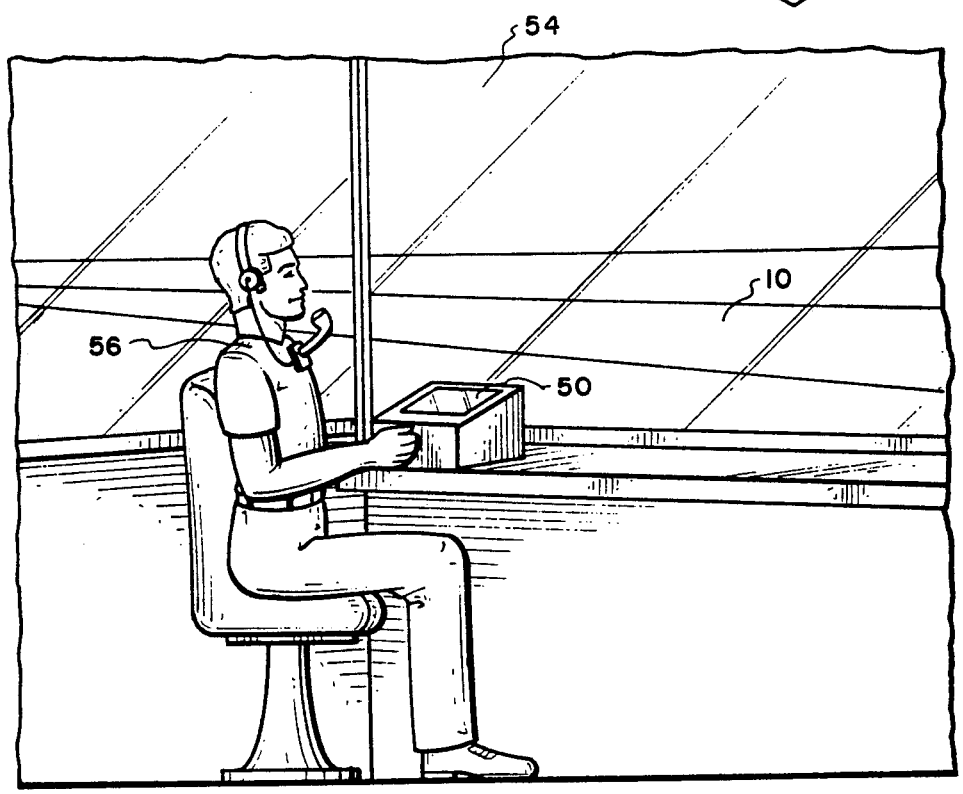
FIG. 4 shows a flight controller position directly adjacent his or her monitoring screen within the control tower.

Referring particularly to FIGS. 3 and 4, there is shown a typical aircraft runway. Mounted in close proximity to the aircraft runway of the airport is a building 62 which includes a control tower 52. Within the control tower 52 is a series of windows 54. These windows 54 are intended to provide a clear unobstructed view of the airport runway and surrounding area by the flight controller 56. The flight controller 56 is generally located directly adjacent the interior of the window 54. The flight controller is able to observe at all times a flight controller monitoring screen 50 which is to display to the flight controller 56 the position of all aircraft in the vicinity of the runway 10. This vicinity can extend fifty miles or more out from the runway 10, but as far as the present invention is concerned, only the first five miles in the vicinity of the runway 10 is of concern.

The runway 10 can be at least 10,000 feet long. Along each side of the runway 10 there is located a plurality of detection devices 12 with each detection device being identical. Normally, these detection devices 12 will be located in a zig-zag pattern relative to the runway 10. In alignment with at least one end and generally both ends of the runway 10, some spaced distance out from the end of the runway and located in what is determined the take-off and approach patterns for the runway 10, there will be similarly mounted in a particularly selected pattern a second set of detection devices 14. Both devices 12 and 14 will in all probability be identical. The devices 14 may typically be spaced about 700 feet apart whereas the devices 12 only need to be spaced about 1,000 feet apart. However, this spacing can certainly vary.

Each anemometer device 12 and 14 is to be composed of a globular type of metallic frame 16 upon which are mounted in a spaced apart arrangement a plurality of sensors 18. A desireable form of an air flow sensor would be model number AWM2000 series, defined as a microbridge mass airflow sensor, manufactured by Micro Switch, a division of Honeywell of Freeport, Ill. Any desireable air flow sensor could be utilized.

The frame 16 could be constructed of tubing or solid members and is termed a hot wire anemometer. This hot wire anemometer, when subjected to wind, can be useful in defining the direction of the wind. The output of the sensors 18 and of the hot wire of the anemometer is to be transmitted through electrical conductor 28 to a digital converter 30. Instantaneous air-flow readings are more readily obtained with the hot-wire anemometer. A resistance wire heated by an electric current is placed in the flow stream. The temperature of the wire depends on the current and the rate at which heat is conducted away from it. This latter factor is related to the thermal properties of the air and its velocity past the wire. Air flow can be measured in terms of (1) the current through the wire to maintain a fixed temperature, (2) temperature of the wire for a fixed current, or (3) temperature rise of the air passing the wire for fixed current. The wire temperature is readily measured in terms of its resistance. The anemometer must be specially calibrated.

There also may be utilized in conjunction with the digital converter 30 a back-up air velocity arrangement in the form of anemometers 20 and 22. Anemometer 20 is to detect vertical air velocity while anemometer 22 is designed to detect horizontal air velocity. The outputs of the anemometers 20 and 22 are transmitted respectively by conductors 24 and 26 to the digital converter 30. The function of the digital converter is to transform the information received into a digital useable form which is then transmitted through conductor 32 to a computer 34.

Also conducted to the computer 34 is known conventional information of an aircraft surveillance radar 36, a weather radar 40 and an aircraft ground radar 44. The surveillance radar 36 is transmitted through conductor 38 to the computer 34. The weather radar 40 is transmitted through conductor 42 to the computer 34. The output of the aircraft ground radar 44 is transmitted through conductor 46 to the computer 34. The aircraft ground radar 44 is for the purpose of detecting presence of aircraft on the runway and in the air and up to three hundred feet above the ground. The aircraft surveillance radar works from the three hundred feet to possibly 18,000 feet in altitude. The weather radar 40 is designed to detect weather conditions such as any kind of severe weather disturbance. This is usually done by what is termed a doppler radar. The radars 36, 40 and 44 all work in the area of the runway 10 as well as the take-off and approach areas for the runway 10.

The output of the computer 48 is transmitted through the flight controller monitoring screen 50. It is on the screen 50 that a colorful representation of a microburst 58 is depicted. The aircraft 60 can be communicated with by the flight controller 56 to take appropriate evasive action so as to not incur the dangerous condition of the microburst or any other dangerous winds 58. The position of the aircraft 60 relative to the microburst 58 can be readily observed by the flight controller 56 since both are depicted in their appropriate location on the screen 50. Also, the wake 64 from aircraft 66 is observed on the screen 50. When wake 64 can no longer be observed, the flight controller 56 knows it is safe for the next aircraft to take off.

Under dry conditions where weather radar can not detect wind shears, the ground detection devices 12 and 14 will complement th system to depict the wind shear on the screen 50.

What is claimed is:

1. In combination with an airport, said airport having an airplane runway usable for take-off and landing of aircraft, a control tower within which is housed at least one air traffic controller, said controller being able to observe a monitoring display screen, said screen being used by said controller to determine the altitude and position of aircraft during take-off and landing on said runway, said airport having doppler weather radar for obtaining weather information signals, said airport having surveillance radar for ascertaining position of an aircraft in the vicinity of said airport, and an apparatus for detecting of a meteorological condition known as a microburst and for detecting aircraft wake turbulence within the immediate vicinity of said runway, said apparatus comprising:

a plurality of wind direction and wind velocity devices mounted directly adjacent to said runway and outward some distance in alignment with said runway along the take-off path and approach path for said aircraft, each said device to output data on either wind velocity and/or wind direction, each said device is in the form of a globular open metallic frame which permits wind to readily pass therethrough, a plurality of wind detection sensors being mounted on said metallic frame in a spaced apart manner, said metallic frames being electrically heated to an elevated temperature, whereby as air passes through said metallic frame the velocity and wind direction of the air can be measured by the rate at which heat is conducted away from said metallic frame; and a computer for receiving said data from said devices along with said weather information signals from said doppler weather radar, said computer also receiving input signals from said surveillance radar, said computer being connected to said display screen, said computer being programmed to display a colorful pictorial representation of said microburst on said display screen in addition to data from said doppler weather radar and said surveillance radar, said colorful pictorial representation resembling the actual appearance of said microburst in conjunction with the terrain if said microburst could be observed, said computer causing displaying on said display screen the location of said microburst relative to said runway and any said aircraft that may be approaching said microburst, said microburst being displayed on said display screen reasonably accurately in size in relation to said aircraft and said runway, said microburst being displayed on said display screen in a horizontal position relative to said airport and said aircraft, whereby this approaching of said microburst is to be communicated to the pilot of the aircraft by the air traffic controller so the aircraft can take appropriate evasive action.

2. The combination as defined in claim 1 wherein:

said devices being spaced apart in a pattern which extends from one fourth to two miles out from said runway along said take-off path and said approach path.

* * * * *